(12) United States Patent
Pipko

(10) Patent No.: US 6,331,202 B1
(45) Date of Patent: Dec. 18, 2001

(54) ANTI-CORROSIVE PIGMENTS

(75) Inventor: Gregory Pipko, Katzrin (IL)

(73) Assignee: Pigmentan Anticorrosive Pigments for Paints Ltd., Katzrin (IL)

( * ) Notice: Subject to any disclaimer, the term of this patent is extended or adjusted under 35 U.S.C. 154(b) by 0 days.

(21) Appl. No.: 09/380,782

(22) PCT Filed: Mar. 5, 1998

(86) PCT No.: PCT/IL98/00108

§ 371 Date: Jan. 27, 2000

§ 102(e) Date: Jan. 27, 2000

(87) PCT Pub. No.: WO98/40440

PCT Pub. Date: Sep. 17, 1998

(30) Foreign Application Priority Data

Mar. 9, 1997 (IL) .......................................... 120399

(51) Int. Cl.[7] ................. C09D 5/08; C08K 5/17; C08K 5/5399

(52) U.S. Cl. ..................... 106/14.37; 106/14.05; 106/14.15; 106/14.34; 106/14.35; 106/14.42; 106/14.44; 106/493; 252/389.21

(58) Field of Search ............................. 106/14.05, 14.15, 106/14.34, 14.35, 14.37, 14.39, 14.42, 14.44, 14.21, 493; 252/389.21

(56) References Cited

U.S. PATENT DOCUMENTS

| 3,906,126 | 9/1975 | Kaiser et al. ...................... 428/35.9 |
| 5,023,368 | 6/1991 | Leighton et al. .................... 560/195 |
| 5,057,156 | 10/1991 | Kuwajima et al. .................. 106/403 |

*Primary Examiner*—Anthony Green
(74) *Attorney, Agent, or Firm*—Eitan, Pearl, Latzer & Cohen-Zedek

(57) ABSTRACT

The invention relates to a paint and/or a coating composition comprising anti-corrosive composition comprises at least one oxyaminophosphate pigment and at least one oxynitrite, oxymetalphosphate, oxyborate or oxysilicate. A method for the oxyaminophosphate pigment is provided.

14 Claims, No Drawings

ANTI-CORROSIVE PIGMENTS

This application is the national phase under 35 U.S.C. §371 of PCT International Application No. PCT/IL98/00108 which has an International filing date of Mar. 5, 1998, which designated the United States of America.

FIELD OF THE INVENTION

The present invention relates to anti-corrosive compositions in paint form.

BACKGROUND OF THE INVENTION

Every year about 5% of iron products in the world are being replaced due to corrosion.

Different coatings are used to reduce the corrosion damage, the most popular being paints. The rust protective element in paints is generally an anti-corrosive pigment. Traditionally the most effective corrosion inhibiting pigments have been based on chromates, and between them especially zinc chromate.

Studies have shown that these, the best anticorrosive pigments (zinc chromate based) are potentially carcinogenic agents. Today, instead of zinc chromate sometimes there are used zinc phosphate based pigments in various combinations. But zinc is a heavy metal and all heavy metals are harmful to humans. Due to the growing awareness to the environmental harm associated with heavy metals, the market has been seeking non-toxic and cost effective replacements capable of performing at least as zinc chromate or zinc phosphate based pigments.

SUMMARY OF THE INVENTION

According to the invention there is provided a new class of effective anti-corrosion pigments which do not contain chromate or heavy metal ions.

There is thus provided, in accordance with an embodiment of the invention, anti-corrosive compositions in paint form wherein the corrosion inhibitor is an oxyaminophosphate pigment and the mixture of them with are any of a group including oxynitrites, oxymetalphosphates, oxyforates and oxysilicates.

Furthermore, in accordance with an embodiment of the invention, amines used for pigment preparation are any of a group including morpholine, dicyclohexylamine, ethanolamines, aliphatic amines, aromatic amines, melamine, hexamethylentetramine and pentaethylenetetramine.

Furthermore, in accordance with an embodiment of the invention, the aminophosphates are obtained by reaction between organic amines and phosphoric acid in water.

Furthermore, in accordance with an embodiment of the invention, 0.5–3 moles or organic amines are reacted with 0.5–3 moles of phosphoric acid.

Furthermore, in accordance with an embodiment of the invention, where the solution of the reaction product between amines and phosphoric acid is hardened by addition of alkaline-earth oxides, iron oxides, zinc oxide, molybdenioxide, aluminum hydroxides, manganese oxides, or corresponding hydroxides resulting in oxyaminophosphates.

Furthermore, in accordance with an embodiment of the invention, alkaline-earth oxides (hydroxides) are used as hardening agents for obtaining oxyaminophosphates.

Furthermore, in accordance with an embodiment of the invention, oxides (hydroxides) or iron, manganese, zinc, molybdene or other metals that have corrosion inhibition properties are used as modifiers. The oxide quantity in the final composition is between 20–70%.

Furthermore, in accordance with an embodiment of the invention, the composition contains surface active agents for better homogenization of the reaction mixture. Lignosulfonates, nonionics surface active agents cationic or anionic surface active agents are used as surface active agents.

Finally, in accordance with an embodiment of the invention, water solutions of anti-corrosion agents in salts form as benzoates, nitrites, nitrates, silicates, aminoacetates, carbonates, chromates, etc. may be used after reaction with alkali earth oxides (hydroxides) or zinc oxide, iron oxide, aluminum oxide, hydroxides, molyboler oxide or other metal oxides, as modifiers or anti-corrosion agents

DESCRIPTION OF THE INVENTION

Many very effective anti-corrosive inhibitors are known for water system or water-steam generators. But all these very effective anti-corrosion inhibitors are very soluble in water and because of the high solubility, are not suitable for use as paint pigments.

The inhibiting action of anti-corrosion pigments is based on their ability to keep small concentration of corrosion inhibiting ions on the surface of the painted metals when water penetrates the paint film to reach the metal surface.

It is known that organic amines are very active as anti-corrosive agents in aqueous systems at various temperatures. Between them are: morpholine, dicyclohexylamine, hexamethylenetetramine, ethanolamines (mono, di-and tri-), amino acids, butylamines, etc. Many of them, in various formulations, are used as corrosion inhibitors for water-steam systems. Phosphoric acid and various phosphates also are known as active corrosion inhibitors, mainly for water systems. Zinc phosphate compositions, with various additives such as aluminum, molybdene, borates, etc. are also used in paint systems.

Combinations of organic amines and inorganic phosphates or phosphoric acid also sometimes used for corrosion inhibition, but they have a high water solubility. According to the invention there are provided low water solubility, controlled slow release compositions as anti-corrosive pigments for paints, both solvent based and also waterborne.

The first stage is a reaction between organic amines and phosphoric acid or acid phosphate, giving organic phosphates. The reaction takes place in an aqueous solution.

Second stage: reaction between aqueous solution of amino-phosphates from the first stage and oxides of alkaline earth metals or corresponding hydroxides.

The obtained oxyaminophosphates, after washing and milling, have very good anti-corrosive properties and may be used as anti-corrosive inhibitors for solvent based and waterborne paints.

On the second stage together with aminophosphates water solution of various corrosion inhibitors in salt form may be used in form of reaction product with oxides of alkaline earth metals or corresponding hydroxides. For example, water solutions of benzoates, ethylenediamine-tetraacetic acid salts, soluble silicates or sodium or potassium nitrites, nitrates, carbonates, chromates, etc.

Excerpts alkali earth oxides or hydroxides also may be used other oxides that reacts with reaction with water solution of various anticorrosive salts or their compositions with obtaining various oxycompounds, for example, zinc, stronthildes, molybdene, aluminum, iron, manganese or similar oxides or hydroxides.

These oxides may be used together with alkaline earth oxides (hydroxides) for obtaining a synergistic effect.

EXAMPLE 1

1 mole of morpholine is added under continuous mixing to 1 mole of a 40% solution of phosphoric acid 0.5 g 10% Ca-lignosutonate solution is added to the 10.0 g reaction mixture and the product is mixed with 5 gr of calcium hydroxide. The reaction is carried out at ambient temperature for 20–40 minutes. After hardening, the reaction product is washed, dried and milled to >600 mesh powder. The obtained product has good anti-corrosion properties. It is used in anti-corrosive points at 6 to 20 weight per cent, preferably 8 to 12 weight per cent.

EXAMPLE 2

2 moles of monoethanolamine is added under continuous mixing to 1 mole of 50% phosphoric acid. 10 g of the reaction product is mixed with 0.1 NP-9 (nonylphenol type detergent, nonionic) and 6 gr iron oxide ($FE_2O_3$). After hardening the product is washed, dried and milled to >600 mesh powder. The obtained product has good anti-corrosive properties in compositions with alkyl type paints, where it is used as 15% (weight) instead of zinc chromate in paint composition.

EXAMPLE 3

1 mole melamine is mixed with 2 moles of phosphoric acid; 0.2 g solution (lignosulfonate Na type from Boregaard Ltd. Norway,) is dissolved in 10 g of obtained reaction product and the mixture is mixed with 3 gr of magnesium oxide. The reaction product is washed, dried and milled to >600 mesh powder. The obtained product has good anti-corrosion properties in salt spray camera in comparison with zinc chromate pigments.

EXAMPLE 4

2 moles of dicyclohexylamine are reacted with 1 mole 35% phosphoric acid. The reaction mixture is hardened by addition of 7 gr zinc oxide per 10 gr of reaction solution with 0.2 g 50% Na-LABs detergent. After washing, drying and milling to >600 mesh powder the product has good anti-corrosion

EXAMPLE 5

2 moles of morfoline and 0.5 mole of 10% $Na_2$-ethylenediamine-tetraacelate are reacted with 1 mole of 25% phosphoric acid. The reaction mixture is hardened by addition of 6 gr magnesium oxide per 10 g of reaction solution.

After washing, drying and milling to >600 m powder the product has good anti-corrosion properties.

Mixtures with oxynitrites oxymetalphosphates, oxyborates, oxysilicates can be used.

EXAMPLE 6

| | |
|---|---|
| a. Anticorrosive pigments | 60 gr |
| b. Micronized talc | 96.7 gr |
| c. Titanium dioxide | 36.2 gr |
| d. Red iron oxide | 61.5 gr |
| e. Bentone | 10.3 gr |
| f. Catalyst (mixture of Co, PB, Mn, naphtenate | 6.7 gr |
| g. Alcohol | 350 g |

This composition passed TNO cyclic test or paint during 1000 hours.

What is claimed is:

1. A paint and/or coating composition comprising an anti-corrosive composition wherein said anti-corrosive composition comprises at least one oxyaminophosphate pigment and at least one oxynitrite, oxymetalphosphate, oxyborate or oxysilicate.

2. The composition of claim 1, wherein said oxyaminophosphate pigment is obtained by the following steps:
    reacting organic amines and phosphoric acid in water so as to obtain organic phosphates; and
    reacting an aqueous suspension of said organic phosphates and oxides of alkaline earth metals or corresponding hydroxides, thereby obtaining said oxyaminophosphate pigment.

3. The composition of claim 2, where the organic amines are selected from a group consisting of morpholine; dicyclohexylamine, ethanolamines, aliphatic amines, aromatic amines, melamine, hexamethylentetramine and pentaethylenetetramine.

4. The composition of claim 3, where 0.5–3 moles of organic amines are reacted with 0.5–3 moles of phosphoric acid.

5. The composition of claim 2, wherein said aqueous suspension of said organic phosphates comprises at least one oxide or hydroxide of the group consisting of alkaline-earth metals, iron, zinc, molybdenum, aluminum and manganese.

6. The composition of claim 5, wherein the aqueous suspension of organic phosphates further comprises alkaline-earth oxides or hydroxides.

7. The composition of claim 1 further containing an oxide quantity of between 20–70%.

8. The composition of claim 1, further comprising surface active agents.

9. The composition of claim 8, wherein the surface active agents are selected from the group consisting of lignosulfonates, nonionic surface active agents, cationic and anionic surface active agents.

10. The composition of claim 2, wherein said aqueous suspension further comprises anti-corrosion agents in salt form so as to decrease solubility of a corrosive metal.

11. The composition of claim 10, wherein said corrosive metal is iron.

12. The composition of claim 10, wherein said anti-corrosion agents are selected from the group consisting of benzoates, nitrites, nitrates, silicates, amino-acetates, carbonates and chromates so as to improve the anti-corrosive properties of said composition.

13. The composition of claim 12, further comprising surface active agents.

14. The composition of claim 13, wherein the surface active agents are selected from the group consisting of lignosulfonates, nonionic surface active agents, cationic and anionic surface active agents.

* * * * *